US006296972B1

(12) United States Patent
Hong et al.

(10) Patent No.: US 6,296,972 B1
(45) Date of Patent: Oct. 2, 2001

(54) METHOD FOR PREPARING LICOO$_2$-COATED NIO CATHODES FOR MOLTEN CARBON FUEL CELL

(75) Inventors: Seong Ahn Hong; In-Hwan Oh; Tae Hoon Lim; Suk Woo Nam; Hyung Joon Choi; Heung Yong Ha; Seung-Goo Kim, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/296,741

(22) Filed: Apr. 23, 1999

(30) Foreign Application Priority Data

Apr. 24, 1998 (KR) .................................................. 98-14728
Nov. 16, 1998 (KR) .................................................. 98-49137

(51) Int. Cl.$^7$ ............................. H01M 4/32; H01M 8/14; H01M 4/86
(52) U.S. Cl. ................................. 429/223; 429/16; 429/45
(58) Field of Search ................................. 429/223, 224, 429/218.1, 231.95, 16, 45

(56) References Cited

U.S. PATENT DOCUMENTS

| 5,356,731 | * | 10/1994 | Sitters et al. ............................ 429/45 |
| 5,589,287 | * | 12/1996 | Hatoh et al. ............................ 429/41 |
| 5,591,548 | * | 1/1997 | Mao ...................................... 429/218 |
| 5,983,488 | * | 11/1999 | Erickson et al. ......................... 29/731 |
| 6,037,095 | * | 3/2000 | Miyasaka ............................ 430/218.1 |
| 6,153,257 | * | 11/2000 | Hong et al. ............................ 427/115 |

OTHER PUBLICATIONS

Van Nostrand Reinhold, p. 570–574, "Fuel Cell Handbook", 1998.
Joel D. Doyon, et al., J. Electrochem Soc., vol. 134, No. 12, p. 3035, "NiO Solubility in Mixed Alkali/Alkaline Earth Carbonates", Dec. 1987.

K. Tanimoto, et al., Journal of Power Sources, vol. 39, p. 285–297, "Cell Performance of Molten–Carbonate Fuel Cell with Alkali and Alkaline–Earth Carbonate Mixtures", 1992.

K. Den–ichiro Ota, et al., Elec. Soc. Pro., vol. 97–4, p. 238–252, "Materials Durabilities for MCFC", 1997.

Hyung–Joon Choi, et al., Journal of Power Sources, vol. 61, p. 239–245, "An Evaluation of a Stabilized NiO Cathode for the Reduction of NiO Dissolution in Molten Carbonate Fuel Cells", 1996.

L. Plomp, et al., Journal of Power Sources, vol. 39, p. 369–373, "Improvement of Molten–Carbonate Fuel Cell (MCFC) Lifetime", 1992.

C. Lagergren, et al., J. Elec. Soc., vol. 141, No. 11, p. 2959–2966, "Syntheses and Performance of LiCoO$_2$ Cathodes for the Molten Carbonate Fuel Cell", Nov. 1994.

\* cited by examiner

*Primary Examiner*—Wayne Langel
*Assistant Examiner*—Jonas N. Strickland
(74) *Attorney, Agent, or Firm*—Oblon, Spivak, McClelland, Maier & Neustadt, P.C.

(57) ABSTRACT

A LiCoO$_2$-coated NiO cathode for molten carbonate fuel cell is provided, wherein the cathode is prepared by dissolving a stoichiometric amount of lithium salts and cobalt salts in a solvent with or without adding a chelating agent to give a sol or a mixed solution, impregnating a NiO electrode for MCFC into the sol or the mixed solution, and drying and calcining the resulting electrode. By using the cathode of the invention, lifetime of the cell can be extended by two or more times while maintaining cell performance.

21 Claims, 4 Drawing Sheets

METHOD FOR PREPARING LICOO$_2$-COATED NIO CATHODES FOR MOLTEN CARBON FUEL CELL

BACKGROUND OF THE INVENTION

1. Field of the Invention

The present invention relates to a cathode for use in a molten carbonate fuel cell (MCFC) and methods for preparation thereof. More particularly, the invention relates to a LiCoO$_2$-coated NiO cathode for use in a molten carbonate fuel cell and methods for preparation thereof, which comprises coating LiCoO$_2$ on the surface of a NiO cathode for MCFC to reduce dissolution of NiO into electrolytes. The present invention provides a cathode for a molten carbonate fuel cell having a long lifetime as compared to the prior cathode while maintaining the performance of the fuel cell.

2. Description of the Background

In the prior art, nickel oxide (NiO) which has been usually used as a raw material in the cathode for a MCFC is known as an optimal cathode material because it is cheap and its electrochemical performance excellent. However, when cell operation times become longer, NiO is liable to dissolve into electrolytes as Ni ions and the dissolved Ni ions may be precipitated in the electrolytes matrix to cause electrical shorting of the cell, which shorten the lifetime of the cell.

Therefore, many attempts have been made to reduce dissolution of NiO into the electrolytes.

For example, a method is proposed for inhibiting the dissolution of the electrode by controlling the operation condition of the cell. Generally, dissolution of NiO on the electrolytes may depend upon partial pressure of CO$_2$ in the cathode gas, cell operation temperature, concentration of H$_2$O, etc. Reduction of the dissolution of the NiO through the control of operation conditions may increase the lifetime of the cell though it cause to slightly reduce the cell performance. For example, the partial pressure of the CO$_2$ in the cathode is lowered and the thickness of the matrix is increased, and then it takes the longer time to reach to shorting of the cell so that the lifetime of the cell may be extended (See, A. J. Appleby and F. R. Foulkes, "Fuel Cell Handbook", 570, Van Nostrand Reinhold, New York (1988)). However, the above approach results in the problem in that the cell performance is reduced and that the extension of the lifetime of the cell is not so long.

Also, other attempts have proposed to control the components of carbonate used as electrolytes in the MCFC or to add additional components such as a basic component to NiO electrode. Since NiO is usually dissolved into the electrolytes by acidic dissolution mechanisms under the general cell operation condition of MCFC, increase of the basicity of the electrolytes cause to lower the dissolution of the NiO. For examples, instead of eutectic salts comprising of 62 mole % of Li$_2$CO$_3$ and 38 mole % of K$_2$CO$_3$ which are usually used as electrolytes in the prior art, eutectic salts containing the high contents of Li$_2$CO$_3$ or Li$_2$CO$_3$-Na$_2$CO$_3$ eutatctic salts may be used. There have also been attempts to propose to add carbonate of alkali earth metal such as MgCO$_3$, CaCO$_3$, SrCO$_3$, BaCO$_3$ into the electrolytes comprising of 62 mole % of Li$_2$CO$_3$ and 38 mole % of K$_2$CO$_3$, or to add alkali earth metal oxide such as MgO to a NiO electrode itself. See, J. D. Doyon, T. Gilbert, G. Davis, J. Electrochem. Soc., 134, 3035–3038 (1987); K. Tanimoto et al., J. of Power Sources, 39, 285–297 (1992); K. Ota, Proceedings of the Fourth Internal Symposium on Carbonate Fuel Cell Technology, Ed. by J. R. Selman, The Electrochemical Soc., Pennington, N.J., 238–252 (1997); and H. J. et al., J. of Power Sources, 61, 239–245 (1996). However, when composition of the electrolytes is varied so as to increase their basicity, such a change of the composition may result in adverse effects on the cell performance.

Furthermore, there have been attempts to propose to develop substitute materials for NiO in the fuel cell. Up to now, lithium compounds such as LiFeO$_2$, LiMnO$_2$, LiCoO$_2$, etc., have been discussed as such substitute materials. However, LiFeO$_2$ and LiMnO$_2$ have poor cell performance. LiCoO$_2$ is known as a reliable substitute material, but it has lower electrical conductivity than that of NiO. Thus, resulting in poor cell performance. Also, the mechanical strength of an electrode made from LiCoO$_2$ is weak resulting in difficult installing electrodes with fuel cells. In addition, the price of Co precursor is relatively expensive, increasing production costs of the cell. See, Plomp, J. N. J. Veldhuis, et al., J. of Power Sources, 39, 369–373 (1992); C. Lagergren, et al., J. Electrochem. Soc., 141, 2959 (1994). in cases that where such substitute materials are used as electrodes in fuel cells, although the dissolution of the cathode on the electrolytes is reduced by ⅒ of conventional cathode, there arises many problems, such as deterioration of the cell performance due to a reduction in electrical conductivity, difficulty in producing of the large size cells due to the poor mechanical strength of the electrode, expensive production costs, etc.

The present inventors have carried out many investigations in order to develop a cathode for use in MCFC having long lifetime without the above problems. As a result, it has been found that a cathode having a long lifetime while maintaining its cell performance can be obtained by coating LiCoO$_2$ on the surface of the NiO cathode to stabilize NiO.

SUMMARY OF THE INVENTION

Therefore, it is an object of the invention to provide a LiCoO$_2$-coated NiO cathode for a molten carbonate fuel cell.

It is an another object of the invention to provide a process for preparation of a LiCoO$_2$-coated NiO cathode for a molten carbonate fuel cell by a sol impregnation method which comprises the steps of:

dissolving a stoichiometric amount of lithium salts and cobalt salts in distilled water, adding a chelating agent to the resulting solution to produce a sol, impregnating a NiO electrode with the sol to form a gel on the surface of the NiO electrode, and drying and calcining the resulting electrode.

It is an another object of the invention to provide a process for preparation of LiCoO$_2$-coated NiO cathode for molten carbonate fuel cell by a solution impregnation method which comprises the steps of:

dissolving stoichiometric amount of lithium salts and cobalt salts in a solvent to give a mixed solution, infiltrating the mixed solution into the inside of a NiO electrode, and drying and calcining the electrode.

DETAILED DESCRIPTION OF THE PREFERRED EMBODIMENTS

According to the invention, a cathode for molten carbonate fuel cell (MCFC) is provided which has long lifetime without any change in the mechanical strength of the electrode and cell performance.

In accordance with the present invention, LiCoO$_2$-coated NiO cathode for MCFC may be produced by the following methods:

1) Sol Impregnation Process

Lithium salts and cobalt salts are dissolved in water, and a chelating agent is added to the resulting solution to form a sol. A conventional NiO electrode is then impregnated with the resulting sol to form a gel on the surface of the NiO electrode, and then dried and calcined with heat treatment to obtain a LiCoO$_2$-coated NiO cathode.

2) Solution Impregnation Process

Lithium salts and cobalt salts are dissolved in an appropriate solvent to form a mixed solution. A conventional NiO electrode is then impregnated with the mixed solution to infiltrate the solution into the inside of the electrode, and then dried and calcined with heat treatment to obtain a LiCoO$_2$-coated NiO cathode.

Lithium salts and cobalt salts which may be used for the preparation of a cathode of the invention, include hydroxides, nitrates, acetates, chlorides, sulfates, oxalates, and combinations thereof.

Hereinafter, a method for the preparation of the cathode of the invention by the sol impregnation process is specifically described.

Figure 1A:
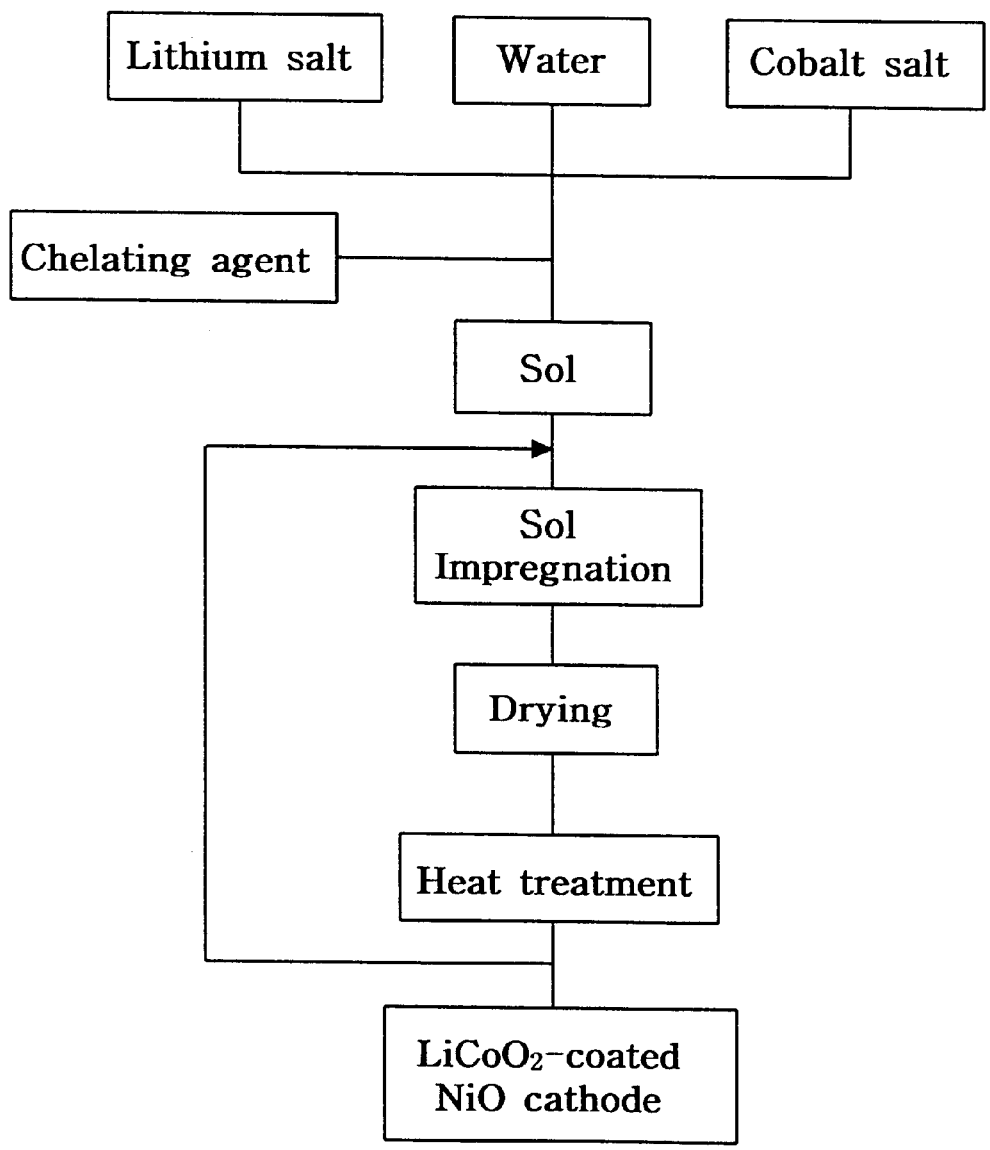
FIGS. 1a and 1b are flow charts of the production process for a LiCoO$_2$-coated NiO cathode according to the invention.

At first, lithium salts and cobalt salts are dissolved in distilled water with stoichiometric ratio of 1:1. A chelating agent is added to the resulting solution to give a sol. The resulting sol is left at about 60–90° C. A conventional NiO electrode for MCFC is then impregnated with sol to form gel on the surface of the NiO electrode at the normal pressure or under pressure. At this time, air in the inside of the NiO electrode may be removed by applying a vacuum to the electrode prior to its impregnation so that the sol can easily permeate into the electrode Subsequently, the resulting electrode is dried and then calcined with heat treatment to obtain a LiCoO$_2$-coated NiO cathode. The flow chart of the sol impregnation process of the invention is shown in FIG. 1a. As shown in FIG. 1a, the impregnation, drying, calcination steps may be repeated so as to coat LiCoO$_2$ on the NiO electrode at desired amount.

A chelating agent which may be used in said sol impregnation process includes polyethylene glycol (PEG), polyvinyl alcohol (PVA), polyacrylic acid, acrylic acid, adipic acid, and combinations thereof. According to the so impregnation process, a thick coating layer can be formed on the electrode. The chelating agent is preferably added in mole ratio of 0.5–2.0 times based on total metal ions in the aqueous solution.

Figure 1B:
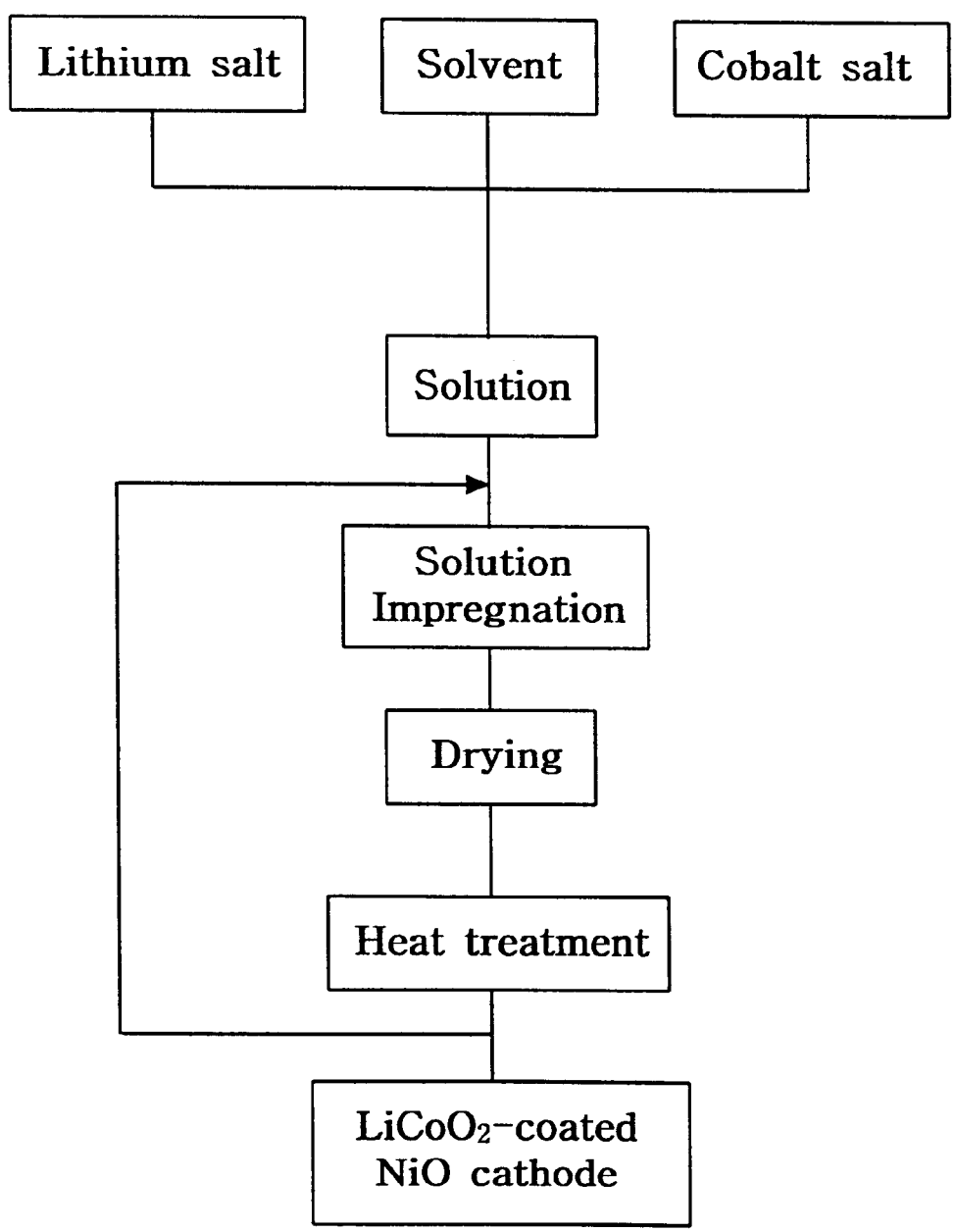

Another method for preparing of the cathode of the invention by the solution impregnation process is specifically described as follows:

At first, lithium salts and cobalt salts are dissolved in an appropriate solvent with a stoichiometric amount of 1:1 to give a mixed solution. The mixed solution is infiltrated into the inside of the electrode, at or above normal pressure. As described in the sol impregnation process above, air in the inside of the NiO electrode may be removed by applying a vacuum to the electrode prior to its impregnation. The resulting electrode is then dried and calcined with heat treatment to obtain a LiCoO$_2$-coat ed NiO cathode. According to the invention, the mixed solution may be infiltrated into the electrode by a dipping or spraying method. In order to control the amount of LiCoO$_2$coated on the NiO electrode at a desired amount, the concentration of lithium salts and cobalt salts in the mixed solution may vary or the impregnation-drying process may be repeated. The flow chart of the solution impregnation process of the invention is shown in FIG. 1b. According the above process, the electrode having a uniform and thin coating layer can be obtained as compared to those of sol impregnation process.

The solvent which is used in the solution impregnation process includes acetic acid, nitric acid, sulfuric acid, hydrochloric acid, water, methyl alcohol, ethyl alcohol, propyl alcohol, acetone, toluene, benzene, aexane, kerosene, and the mixture thereof.

The present invention will be illustrated in greater detail by way of the following examples. These examples are presented for illustration purposes only and should not be construed as limiting the invention, which is properly delineated in the claims.

EXAMPLE 1

1 mole of lithium acetate and 1 mole of cobalt acetate (i.e., 1:1 atomic ratio of lithium and cobalt) were dissolved in 500 g of distilled water to give an aqueous solution. 2 mole of acrylic acid as a chelating agent, where the number of functional groups is doubled times based on the total metal ion dissolved in the aqueous solution, was added to the aqueous solution to give a sol. The resulting sol was left at 80° C. for 24 hrs. A container containing a commercial NiO electrode for MCFC was in a vacuum and then the vacuumed NiO electrode was placed in the resulting sol so as to infiltrate the sol into the micropore of the electrode. The resulting electrodes were dried and calcined in a vacuum oven to obtain an LiCoO$_2$ coated electrode. The above steps were repeated to give several cathodes coated with different amounts of LiCoO$_2$. The obtained coated cathodes and a conventional NiO cathode were each provided with a unit cell of the MCFC, and the unit cell was operated. The construction and the operating condition of the unit cells are shown in Table 1 below.

TABLE 1

The construction and the operating conditions of the unit cells

| | | |
|---|---|---|
| Anode | | Ni + 10% Cr |
| Matrix | | LiAlO$_2$ |
| Cathode | NiO | LiCoO$_2$-coated NiO |
| Electrolyte | | 62Li$_2$CO$_3$ + 38K$_2$CO$_3$ |
| Fuel | | 72% H$_2$/18% H$_2$/10% H$_2$O |
| | | (Utilization = 40%) |
| Oxidant | | 70% Air/30% CO$_2$ |
| Temperature | | 650° C. |

After the above unit cells having different cathodes were operated for 1,000 hrs, amounts of Ni precipitated in matrix were determined with Inductively Coupled Plasma (ICP)

and an Electron Probe Micro Analyzer (EPMA). The results are shown in Table 2 below.

TABLE 2

The amount of Ni precipitated in the matrix after cell operation of 1,000 hrs.

| $LiCoO_2$ Coating Amount (mol %) | Ni precipitated in the matrix (wt %) |
|---|---|
| 0 (non coated) | 3.2–3.5 |
| 1.0 | 2.6 |
| 2.0 | 1.7–2.9 |
| 5.0 | 1.5 |
| 7.9 | 1.4 |

As shown in Table 2, when the $LiCoO_2$ coating amount is 1 to 2 mol %, Ni precipitation is not significantly effected as compared to those of the non-coated conventional electrode, but when $LiCoO_2$-coating amount is 5 mol % or more, Ni precipitation is dramatically reduced by ½ of the conventional electrode.

Figure 2A:
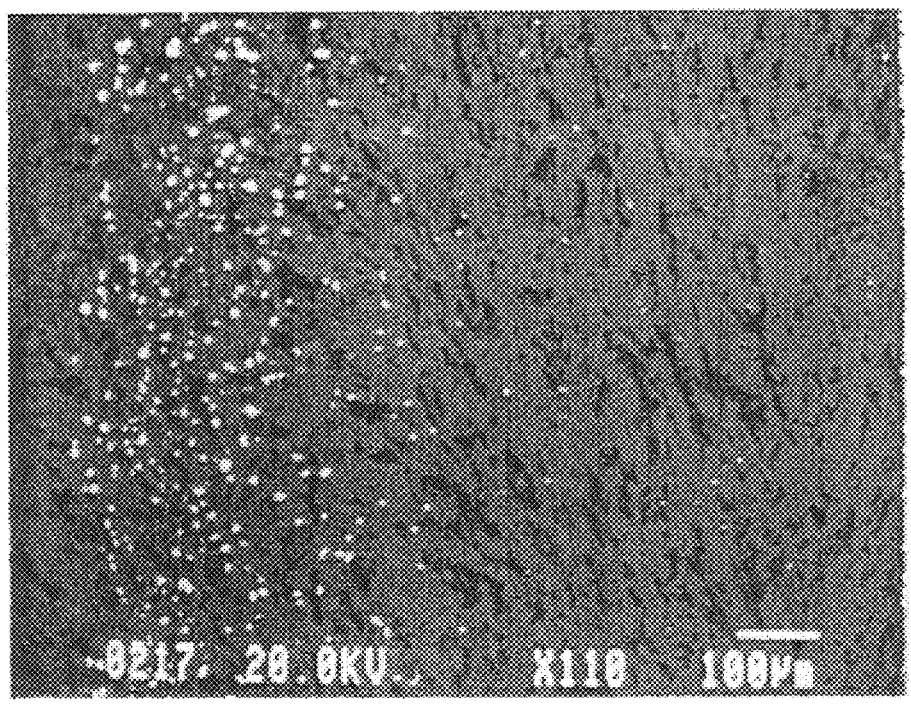
FIGS. 2a and 2b show scanning electron microscopic photographs of electrolytes matrix in the cells with NiO cathode of the prior art and with LiCoO$_2$-coated NiO cathode of the invention, respectively, after 1,000 hrs. of operation.
Figure 2B:
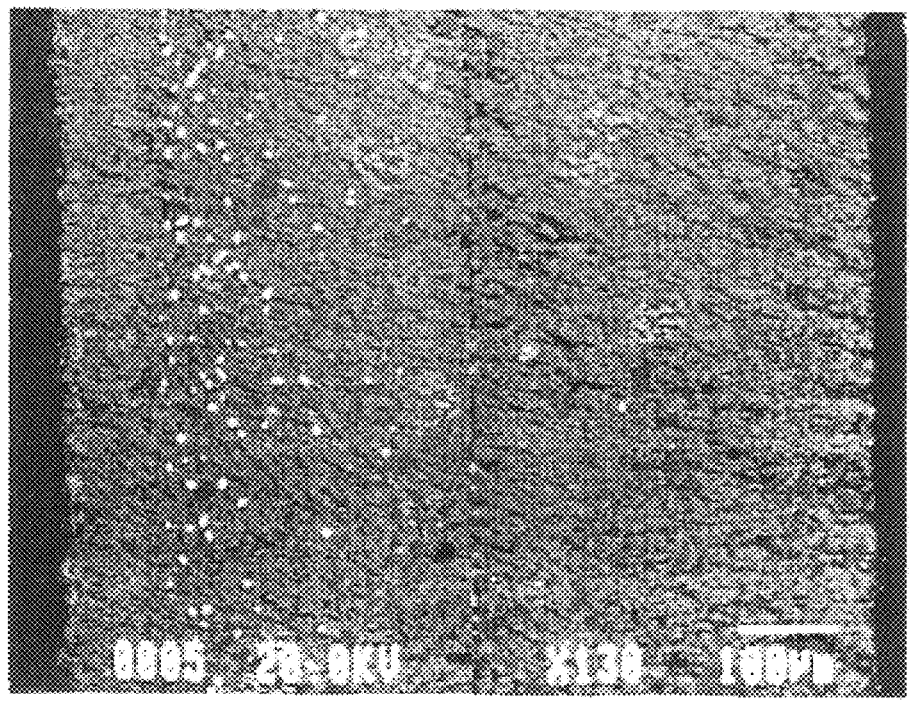

Also, after unit cells having 5 mol % of $LiCoO_2$-coated cathode and non-coated conventional cathode, respectively, were operated for 1,000 hrs, distribution of Ni precipitated in the matrix was analyzed with an EPMA (Electron Probe Micro Analyzer). The results are shown in FIG. 2 as a Ni dot map of cross-surface of the matrix. The white portion indicates precipitated Ni particles.

As shown in FIG. 2, when the cathode of the invention is used in the fuel cell, the number of Ni particles precipitated is dramatically reduced as compared to that of non-coated cathode. It is shown that the dissolution of the cathode can be remarkably reduced by using the cathode prepared according to the present invention.

Figure 3:
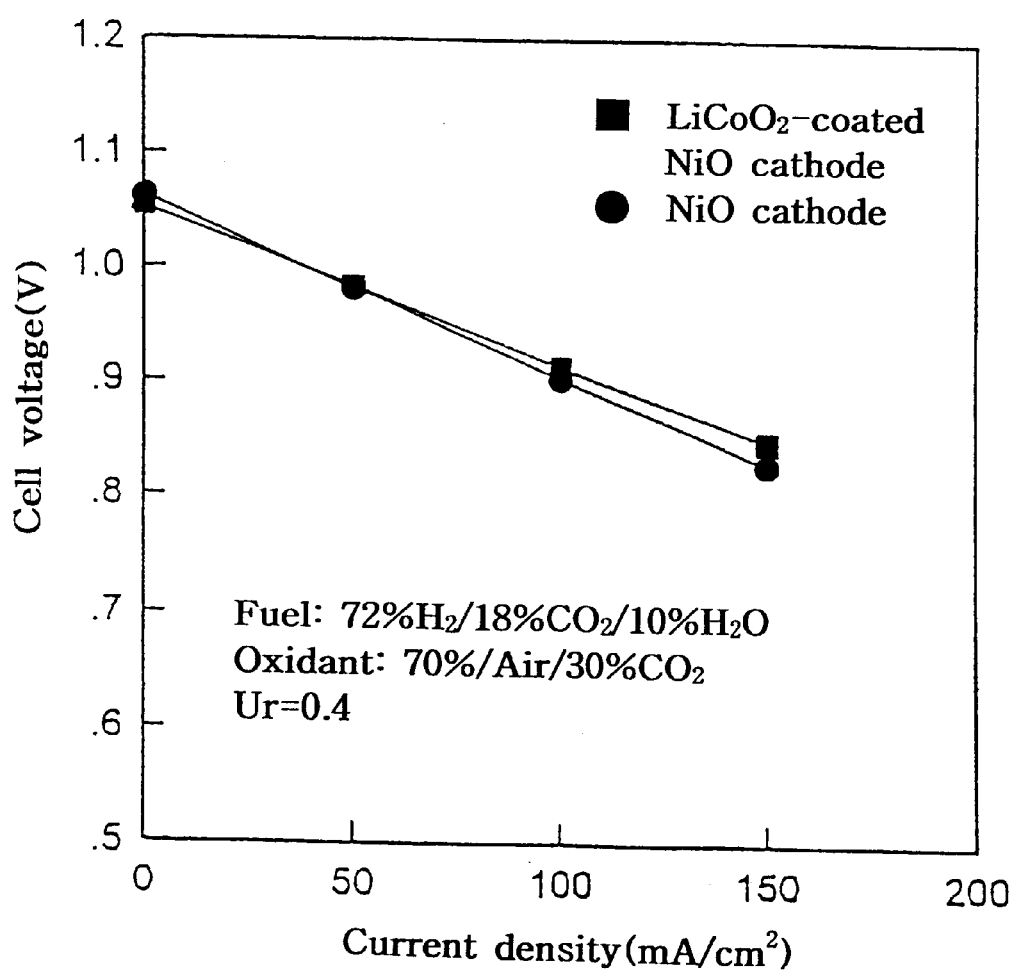
FIG. 3 is a graph showing the relationship between cell voltage and current density in the cells with a NiO cathode of the prior art and with a LiCoO$_2$-coated NiO cathode of the invention, respectively, after 1,000 hrs. operation.

After 1,000 hrs. of cell operation, cell voltage and current density were determined in the cells which uses non-coated NiO cathode and $LiCoO_2$-coated NiO cathode of the invention, respectively, as a cathode for MCFC. The results are given in a graph showing current density-cell voltage in FIG. 3. As shown in FIG. 3, the voltage of a cell using the coated cathode of the invention is similar to that of a non-coated cathode. It is proved that the cell performance of a fuel cell comprising the cathode according to the invention is not changed.

From the above result, it is apparent that by using the cathode of the invention, the lifetime of the cell can be extended two or more times that of the prior cell while maintaining cell performance.

EXAMPLE 2

0.05 mole of $Co(OH)_2$ and 0.05 mole of LiOH were dissolved in 500 g of acetic acid to prepare 0.1 mole of a Co,Li/l mixed solution. An NiO electrode was dipped into the mixed solution to infiltrate it into the inside of the electrode. After 24 hrs, the electrode was air-dried. This process was repeated three times. The electrode was then calcined so as to obtain about 1 mole % $LiCoO_2$-coated NiO cathode. The obtained cathode was installed within a unit cell. The unit cell was operated for 1,000 hrs. according to the operating conditions of the unit cell shown in Table 1 above. The amount of the Ni precipitated on the matrix was then determined to be 1.6 wt %. In comparison with the 3.2–3.5 wt % of Ni precipitation in the case of a non-coated cathode as shown in Table 2, the amount of Ni precipitated in the cathode according to the invention was reduced by 50% or more.

EXAMPLE 3

The procedures of Example 2 were repeated with the exception that the mixed solution was sprayed on an NiO electrode to infiltrate it into the inside of the electrode to obtain about 1 mole % $LiCoO_2$-coated NiO cathode. The obtained cathode was installed within a unit cell. The unit cell was operated for 1,000 hrs. according to the operating conditions of the unit cell shown in Table 1 above. The amount of the Ni precipitated on the matrix was then determined to be 2.0 wt %. In comparison with the case of a non-coated cathode as shown in Table 2, the amount of Ni precipitated was reduced by 40% or more.

Therefore, as shown in the above results, it is proved to significantly reduce the dissolution of NiO electrode by coating $LiCoO_2$ on the electrode.

What is claimed is:

1. A process for preparing a $LiCoO_2$-coated NiO cathode for a molten carbonate fuel cell, which comprises:
   a) dissolving a stoichiometric amount of lithium salts and cobalt salts in distilled water to form a mixed solution;
   b) adding a chelating agent to the mixed solution to produce a sol;
   c) impregnating a NiO electrode with the sol at above normal pressure, or under vacuum condition or a combination thereof to form a gel on the surface of the NiO electrode; and
   d) drying and calcining the resulting electrode.

2. The process of claim 1, wherein the lithium salts and cobalt salts are selected from the group consisting of hydroxides, nitrates, acetates, chlorides, sulfates, oxylates, and combinations thereof.

3. The process of claim 1, wherein the chelating agent is selected from the group consisting of polyethylene glycol (PEG), polyvinyl alcohol, polyacrylic acid, acrylic acid, adipic acid, and combinations thereof.

4. The process of claim 1, wherein said stoichiometric amount of said lithium salts and cobalt salts is 1:1.

5. The process of claim 1, wherein said chelating agent is added in a mole ratio of 0.5–2.0 times based on total metal ions in the solution.

6. The process of claim 1, wherein said impregnating step c) is effected with a solvent selected from the group consisting of acetic acid, nitric acid, sulfuric acid, hydrochloric acid, water, methyl alcohol, ethyl alcohol, propyl alcohol, acetone, toluene, benzene, hexane, kerosene and mixtures thereof.

7. The process of claim 1, wherein said $LiCoO_2$-coated NiO cathode comprises at least 1.0 mol % of $LiCoO_2$.

8. The process of claim 7, wherein said $LiCoO_2$-coated NiO cathode comprises at least 2.0 mol % of $LiCoO_2$.

9. The process of claim 8, wherein said $LiCoO_2$-coated NiO cathode comprises at least 5.0 mol % of $LiCoO_2$.

10. The process of claim 1, wherein the impregnating step c) is effected by spraying.

11. The process of claim 1, wherein said sol is at a temperature of 60 to 90° C. for impregnating said NiO electrode.

12. The process of claim 1, wherein said impregnating step is conducted under a vacuum.

13. A process for preparing a $LiCoO_2$-coated NiO cathode for a molten carbonate fuel cell, which comprises:
   a) dissolving a stoichiometric amount of lithium salts and cobalt salts in a solvent to form a mixed solution;
   b) infiltrating the mixed solution into the inside of a NiO electrode at above normal pressure, or under vacuum condition or a combination thereof; and
   c) drying and calcining the electrode.

14. The process of claim 13, wherein the lithium salts and cobalt salts are selected from the group consisting of hydroxides, nitrates, acetates, chlorides, sulfates, oxylates, and combinations thereof.

15. The process of claim 13, wherein the solvent is selected from the group consisting of acetic acid, nitric acid, sulfuric acid, hydrochloric acid, water, methyl alcohol, ethyl alcohol, propyl alcohol, acetone, toluene, benzene, hexane, kerosene and mixtures thereof.

16. The process of claim 13, wherein the infiltrating step is effected by spraying.

17. The process of claim 13, wherein said sol is at a temperature of 60 to 90° C. for impregnating said NiO electrode.

18. The process of claim 13, wherein said impregnating step is conducted under a vacuum.

19. The process of claim 13, wherein said $LiCoO_2$-coated NiO cathode comprises at least 1.0 mol % of $LiCoO_2$.

20. The process of claim 13, wherein said $LiCoO_2$-coated NiO cathode comprises at least 2.0 mol % of $LiCoO_2$.

21. The process of claim 13, wherein said $LiCoO_2$-coated NiO cathode comprises at least 5.0 mol % of $LiCoO_2$.

\* \* \* \* \*